(12) United States Patent
Nagai

(10) Patent No.: US 9,573,755 B2
(45) Date of Patent: Feb. 21, 2017

(54) MECHANISM FOR OPENING AND CLOSING HOPPER GATE

(75) Inventor: Takayuki Nagai, Hyogo (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 316 days.

(21) Appl. No.: 13/881,704

(22) PCT Filed: Oct. 29, 2010

(86) PCT No.: PCT/JP2010/006417
§ 371 (c)(1),
(2), (4) Date: Jul. 15, 2013

(87) PCT Pub. No.: WO2012/056503
PCT Pub. Date: May 3, 2012

(65) Prior Publication Data
US 2013/0283943 A1    Oct. 31, 2013

(51) Int. Cl.
B67D 3/00 (2006.01)
B67D 7/00 (2010.01)
B65D 90/62 (2006.01)
G01G 19/393 (2006.01)

(52) U.S. Cl.
CPC ............. *B65D 90/62* (2013.01); *G01G 19/393* (2013.01); *Y10T 74/18568* (2015.01)

(58) Field of Classification Search
CPC ........... B65D 90/623; B61D 7/16; B61D 7/18; G01G 19/393
USPC ....................................... 177/25.18; 222/504
See application file for complete search history.

(56) References Cited

U.S. PATENT DOCUMENTS

| | | | | |
|---|---|---|---|---|
| 6,188,029 | B1 * | 2/2001 | Miyamoto | G01G 19/393 |
| | | | | 177/105 |
| 6,605,785 | B1 * | 8/2003 | Muramiya | G01G 19/393 |
| | | | | 177/25.18 |
| 7,712,629 | B2 * | 5/2010 | Bruland | 221/234 |
| 2010/0044116 | A1 * | 2/2010 | Kishikawa | B65B 37/18 |
| | | | | 177/25.18 |

FOREIGN PATENT DOCUMENTS

| | | |
|---|---|---|
| JP | 2002-139371 A | 5/2002 |
| JP | 2003-014530 A | 1/2003 |
| JP | 3429326 B2 | 7/2003 |
| JP | 2004-233193 A | 8/2004 |

(Continued)

OTHER PUBLICATIONS

International Search Report for PCT/JP2010/006417, mailed Nov. 22, 2010.

(Continued)

*Primary Examiner* — Patrick M Buechner
*Assistant Examiner* — Jeremy W Carroll
(74) *Attorney, Agent, or Firm* — Marshall, Gerstein & Borun LLP

(57) ABSTRACT

A hopper gate opening/closing mechanism for use in a combination weigher (100) includes an actuator (31) for generating a driving force for opening and closing the hopper gate; and a cam mechanism (40A, 21) for opening and closing the hopper gate (14A) based on the driving force applied by the actuator (31); wherein the cam mechanism (40A, 21) inhibits the hopper gate (14A) from being opened in a position at which the hopper gate (14A) is closed.

12 Claims, 3 Drawing Sheets

(56) References Cited

FOREIGN PATENT DOCUMENTS

| | | |
|---|---|---|
| JP | 2005-121584 A | 5/2005 |
| JP | 3670295 B2 | 7/2005 |
| JP | 2006-125914 A | 5/2006 |
| JP | 2006-201099 A | 8/2006 |

OTHER PUBLICATIONS

Office Action for Chinese Patent Application No. 2010800684646, dated Jan. 23, 2014.
Supplementary Search Report for EP 10 85 8895, dated Feb. 13, 2015.

* cited by examiner

MECHANISM FOR OPENING AND CLOSING HOPPER GATE

The present invention relates to a mechanism for opening and closing a hopper gate for use in a combination weigher.

BACKGROUND ART

Conventionally, a combination weigher is used to combine objects which are non-uniform in weights to efficiently attain a target weight.

This combination weigher typically includes a dispersion feeder which is capable of dispersing and supplying the objects evenly to components around the dispersion feeder, a plurality of linear feeders arranged at equal intervals around the dispersion feeder, feeding hoppers arranged so as to correspond to the linear feeders, respectively, and weighing hoppers arranged so as to correspond to the linear feeders, respectively.

In the above configuration, the objects are sent from the dispersion feeder to linear troughs of the linear feeders, and the objects of a suitable amount are transported by vibration on the linear troughs by vibration components of the linear feeders and fed to the weighing hoppers coupled to load cells through the feeding hoppers, respectively. The load cells detect weights of the objects inside of the weighing hoppers. Based on a combination of weight values of the weighing hoppers, the weighing hoppers making up an optimal combination in which the weight of the objects falls within a target weight of the objects, are selected. Then, the objects are discharged from the weighing hoppers selected to make up the combination collectively onto a collecting chute located therebelow. A packaging machine packages the collective objects.

In the combination weigher as described above, each of the feeding hopper and the weighing hopper includes a hopper body and a hopper gate. The hopper gate is applied with a load (impact) in a direction to open the hopper gate by a gravitational force of the objects when the objects are fed from a previous unit (linear feeder in the case of the feeding hopper, the feeding hopper in the case of the weighing hopper). Therefore, typically, a stopper section and the like are provided to prevent the hopper gate from being opened by mistake.

For example, Patent Literature 1 discloses a mechanism for opening and closing a hopper gate including a stopper section which is able to inhibit the hopper gate from being opened by restricting a rotation of a support bracket coupled to a hopper unit (e.g., see FIG. 4 in Patent Literature 2). This stopper section is disposed inside of an actuator unit (hopper unit).

By comparison, Patent Literature 2 discloses a mechanism for opening and closing a hopper gate including a toggle link mechanism which is able to inhibit a gate of a hopper from being opened (e.g., see FIG. 7 in Patent Literature 1). The toggle link mechanism is known as a means for effectively holding the hopper gate to prevent the hopper gate from being opened. In particular, since the toggle link mechanism is attached on the hopper body in the example of Patent Literature 2, the interior of the actuator unit can be configured as a simple mechanism.

CITATION LISTS

Patent Literature

Patent Literature 1: Japanese Patent No. 3670295 (FIG. 4)
Patent Literature 2: Japanese Patent No. 3429326 (FIG. 7)

SUMMARY OF INVENTION

Technical Problem

In the mechanism for opening and closing the hopper gate disclosed in Patent Literature 1, since the stopper section of the hopper gate is disposed within the actuator unit, the mechanism inside of the actuator unit becomes complex. In addition, the number of components of the actuator unit increases, and cost increases. Furthermore, a special mechanism for locking and unlocking the stopper section becomes necessary. This causes an increase in complexity of the mechanism and an increase in torque (e.g., motor torque) of the actuator.

In the mechanism for opening and closing the hopper gate disclosed in Patent Literature 2, since the toggle link mechanism (stopper section) is attached on the hopper, because of a weight of the toggle link mechanism, a weight of the hopper increases, and a manufacturing method of the hopper becomes complex. In addition, because of a need for the special mechanism such as the toggle link mechanism, the mechanism becomes complex and the torque (e.g., motor torque) of the actuator increases.

As should be understood from the above, the mechanism for opening and closing the hopper gate disclosed in Patent Literature 1 has a drawback and the mechanism for opening and closing the hopper gate disclosed in Patent Literature 2 has a drawback. There are many points to be improved in these mechanisms for opening and closing the hopper gates.

The present invention has been made under the circumstances, and an object of the present invention is to provide a mechanism for opening and closing a hopper gate which can simplify a configuration of a stopper section of a hopper gate of a combination weigher.

Solution to Problem

Advantageous Effects of the Invention

To achieve the above described object, there is provided a mechanism for opening and closing a hopper gate which is used in a combination weigher which performs combination calculation based on weights of objects, to find a combination in which a total of the weights of the objects falls within an allowable range with respect to a target weight, the mechanism for opening and closing the hopper gate comprising: an actuator for generating a driving force for opening and closing the hopper gate; and a cam mechanism for opening and closing the hopper gate based on the driving force applied by the actuator; wherein the cam mechanism inhibits the hopper gate from being opened in a position at which the hopper gate is closed.

In this configuration, in the mechanism for opening and closing the hopper gate of the present invention, the stopper section of the hopper gate of the combination weigher can be simply configured.

That is, in the mechanism for opening and closing the hopper gate of the present invention, since the cam mechanism is used as a stopper section of the hopper gate, special mechanism (e.g., conventional toggle link mechanism, etc.) for locking and unlocking in the conventional stopper section becomes unnecessary. In addition, it is possible to avoid an increase in torque of the actuator which is caused by locking and unlocking in the conventional stopper section. Furthermore, since the number of components of the stopper section of the hopper gate can be reduced, the configuration of the stopper section can be simplified.

The mechanism for opening and closing the hopper gate of the present invention may further comprise an actuator unit provided with the actuator; wherein the cam mechanism may be disposed outside of the actuator unit.

In this configuration, the cam mechanism can be easily attached to and detached from the actuator unit. Therefore, in the mechanism for opening and closing the hopper gate of the present invention, according to the configuration (e.g., single swing gate type or double swing gate type) of the hopper, an internal volume of the hopper, etc., an optimal cam mechanism can be easily attached.

In the mechanism for opening and closing the hopper gate of the present invention, an operation for opening and closing the hopper gate may be controlled based on a shape of a driving section of the cam mechanism which a driven section of the cam mechanism is configured to contact.

In this configuration, according to the configuration (e.g., single swing gate type or double swing gate type) of the hopper, an internal volume of the hopper, etc., the shape of the driving section of the cam mechanism can be changed (processed) mechanically. Therefore, it is possible to easily provide the driving section having an optimal shape.

In the mechanism for opening and closing the hopper gate of the present invention, the driven section may be a cam follower and the driving section may be a cam holder; and wherein the cam follower may be configured to contact a curved surface of the cam holder to inhibit the hopper gate from being opened.

In this configuration, the stopper section of the hopper gate can be simply formed by using the cam follower and the curved surface of the cam holder.

In the mechanism for opening and closing the hopper gate of the present invention, the driven section may be a cam follower and the driving section may be a cam holder; and wherein the cam follower may be configured to roll on a curved surface of the cam holder to cause the hopper gate to be opened and closed.

In this configuration, the mechanism for opening and closing the hopper gate can be simply formed by using the cam follower and the curved surface of the cam holder.

In the mechanism for opening and closing the hopper gate of the present invention, a curvature radius of a curved surface of the cam holder may be set so as to increase or decrease an opening/closing speed of the hopper gate.

In this configuration, according to the configuration (e.g., single swing gate type or double swing gate type) of the hopper, an internal volume of the hopper, etc., the curvature radius of the curved surface of the cam holder can be changed (processed) mechanically. Therefore, it is possible to easily provide the cam holder which can attain an optimal opening/closing speed of the hopper gate.

In the mechanism for opening and closing the hopper gate of the present invention, a curvature radius of the curved surface of the cam holder which the cam follower contacts in a position where the hopper gate is closed may be greater than a curvature radius of the curved surface of the cam holder which the cam follower contacts in a position in the middle of opening or closing of the hopper gate.

In this configuration, the opening/closing speed of the hopper gate can be decreased in a position which is immediately before the hopper gate is closed, it becomes possible to mitigate a noise which would otherwise be generated by contact between the hopper gate and the hopper body when the hopper gate is opened and closed. On the other hand, since the opening/closing speed of the hopper gate can be increased in the position in the middle of opening/closing of the hopper gate, the opening/closing operation of the hopper gate can be performed efficiently.

In the mechanism for opening and closing the hopper gate of the present invention, an opening degree of the hopper gate may be adjustable based on relative positions of the driven section of the cam mechanism and the driving section of the cam mechanism.

In this configuration, when the hopper gate is closed, the hopper gate can be opened a little with a gap between the hopper gate and the hopper body to an extent that the objects do not fall through the gap. This makes it possible to mitigate a noise which would otherwise be generated by contact between the hopper gate and the hopper body when the hopper gate is opened and closed.

Advantageous Effects of the Invention

In accordance with the present invention, it is possible to provide the mechanism for opening and closing the hopper gate which can simply a configuration of a stopper section of the hopper gate of the combination weigher.

The above and further objects, features and advantages of the present invention will more fully be apparent from the following detailed description of preferred embodiments with accompanying drawings.

DESCRIPTION OF THE EMBODIMENTS

Embodiment

First of all, features of an embodiment of a mechanism for opening and closing a hopper gate according to an embodiment of the present embodiment will be described.

The mechanism for opening and closing the hopper gate (hopper gate opening/closing mechanism) according to the embodiment is a mechanism for use in a combination weigher which performs combination calculation based on weights of objects to find a combination in which a total of the weights of the objects falls within an allowable range with respect to a target weight. The hopper gate opening/closing mechanism includes an actuator for generating a driving force for opening and closing the hopper gate and a cam mechanism for opening and closing the hopper gate based on the driving force of the actuator. The hopper gate opening/closing mechanism is configured to cause the cam mechanism to inhibit the hopper gate from being opened in a position at which the hopper gate is closed.

As described above, the hopper gate opening/closing mechanism of the present embodiment can simplify a configuration of a stopper section of the hopper gate of the combination weigher, with the above described configuration.

Next, an exemplary configuration of the hopper gate opening/closing mechanism of the present embodiment will be described with reference to the drawings.

Throughout the drawings, the same or corresponding components are identified by the same reference symbols and will not be described in repetition.

The description below is merely intended to recite features of the embodiment of the hopper gate opening/closing mechanism. For example, when the wordings which are the same as those which identify the hopper gate opening/closing mechanism or corresponding wordings are assigned by reference symbols, that specific device is an example of the components of the corresponding hopper gate opening/closing mechanism.

Therefore, the features of the embodiment of the hopper gate opening/closing mechanism are in no way intended to be limited by description provided below.

[Specific Example of Hopper Gate Opening/Closing Mechanism]

First of all, an outline of an overall configuration of the combination weigher 100 will be described with reference to the drawings.

Figure 1:
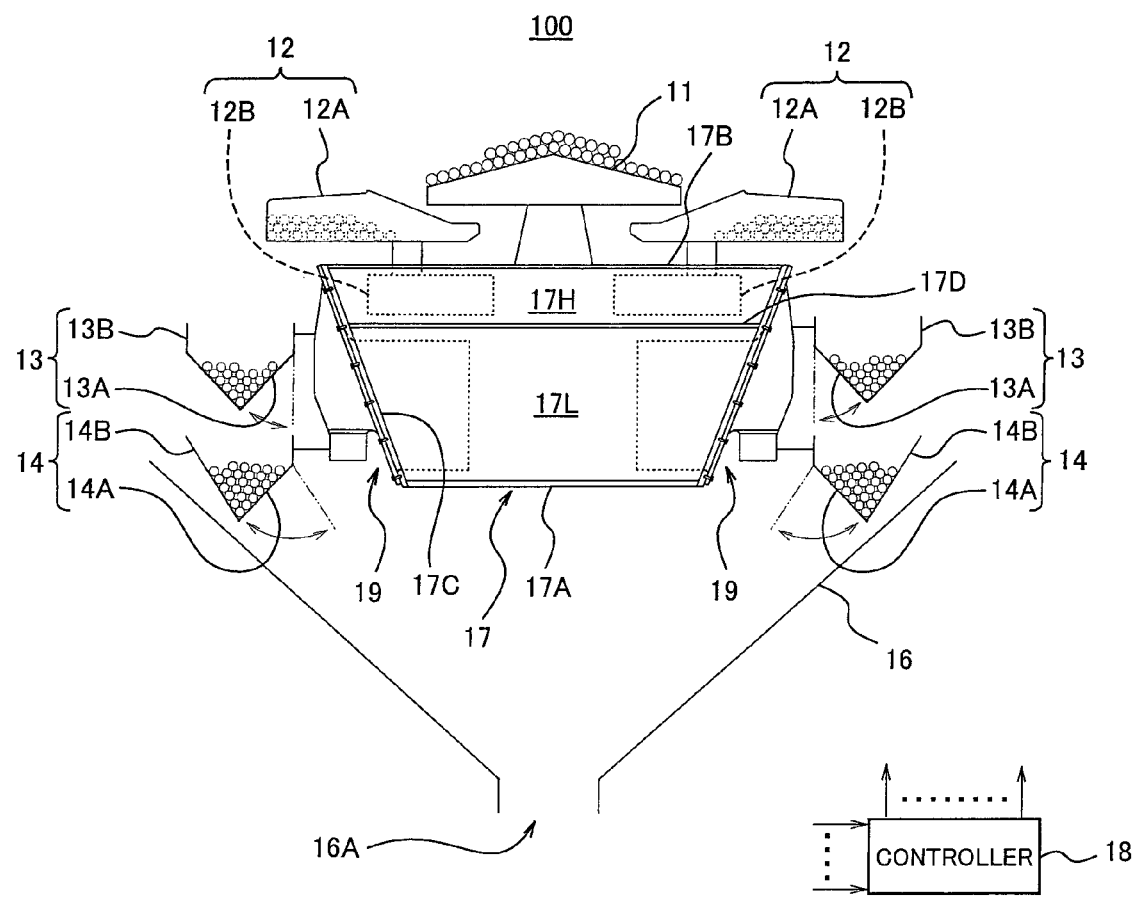
FIG. 1 is a schematic view showing an exemplary combination weigher incorporating a mechanism for opening and closing a hopper gate according to an embodiment of the present invention.

FIG. 1 is a schematic view showing an exemplary combination weigher incorporating the hopper gate opening/closing mechanism according to the embodiment of the present invention.

As shown in FIG. 1, the combination weigher 100 includes a conical dispersion feeder 11 provided at a center portion of an upper portion of the combination weigher 100 to radially disperse objects supplied from an outside supplying device (not shown), by vibration. Around the dispersion feeder 11, a plurality of linear feeders 12 are arranged in a circular shape. The objects sent from the dispersion feeder 11 are vibrated and transported on linear troughs 12A of the linear feeders 12 by vibration of vibration components 12B of the linear feeders 12, respectively, and are sent to the respective feeding hoppers 13.

As shown in FIG. 1, below the linear troughs 12A of the linear feeders 12, a plurality of feeding hoppers 13 and a plurality of weighing hoppers 14 are provided so as to correspond to the linear feeders 12, respectively, and are arranged in a circular shape around the center base body 17 (body) such that they are spaced apart from each other.

Each of the feeding hoppers 13 includes a hopper body 13B and a hopper gate 13A to hold the objects sent from the linear trough 12A of the linear feeder 12, for a specified time, and discharge the objects to the weighing hopper 14 located therebelow. Each of the weighing hoppers 14 includes a hopper body 14B and a hopper gate 14A to hold the objects sent from the feeding hopper 13 located thereabove, for a specified time, and discharge the objects to a collecting chute 16.

The weighing hoppers 14 are coupled to load cells 32 (see FIG. 2) corresponding to the weighing hoppers 41, respectively. The load cells 32 output load signals, respectively (electric signals) to a controller 18.

Below the weighing hoppers 14, the collecting chute 16 of a funnel shape is disposed. The objects selected to make up a discharge combination in the combination weigher 100 are discharged from the weighing hoppers 14 and slide on and along the collecting chute 16. The objects are discharged to, for example, a packaging machine (not shown) through a discharge outlet 16A at a bottom portion of the collecting chute 16.

The controller 18 includes, for example, a microcontroller including a CPU and memories such as ROM and RAM which contain operation programs, operation parameters, etc., of the CPU. The CPU of the controller 18 executes the operation programs stored in the ROM, to, for example, control an operation of the overall combination weigher 100.

That is, the controller 18 controls a vibration amplitude and operation time of each of the dispersion feeder 11 and the linear feeders 12. In addition, the controller 18 controls an operation of actuators (stepping motors 30, 31, etc., as will be described later) for opening and closing the hopper gates 13A of the feeding hoppers 13 and the hopper gates 14A of the weighing hoppers 14.

The controller 18 serves as a weight calculating means which receives the load signals as inputs output from the load cells 32 attached with the weighing hoppers 14, and calculates weights of the objects held in the weighing hoppers 14 based on the load signals. In addition, the controller 18 serves as a combination means which performs a combination process. In this combination process, the controller 18 performs combination calculation based on the calculated weights of the objects to find one combination in which a total of the weights of the objects falls within a predetermined weight range (allowable range with respect to a target weight). If there exist plural combinations in which their total weights fall within the predetermined weight range, a combination in which an absolute value of a difference between a total of the weights of the objects and the target weight is smallest is found. And, the controller 18 determines a combination of the weighing hoppers 14 holding the objects therein corresponding to the combination found in this way as a discharge combination.

The controller 18 causes the hopper gates 14A of the weighing hoppers 14 selected to make up the discharge combination to open and close at a predetermined timing, to discharge the objects from the weighing hoppers 14. To the weighing hoppers 14 which have discharged the objects and have been emptied, the feeding hoppers 13 located thereabove feed the objects. To the feeding hoppers 13 having been emptied, the linear troughs 12A of the linear feeders 12 located thereabove feed the objects.

The controller 18 need not be constituted by a single controller, but a plurality of controllers may be dispersed and cooperate with each other to control the operation of the combination weigher. Although the example in which the weight calculating means and the combination means are constituted by the single controller 18 is described, the weight calculating means and the combination means may be constituted by separate controllers (CPUs).

As shown in FIG. 1, in the combination weigher 100, the center base body 17 corresponding to the body of the combination weigher 100 is disposed at a center portion thereof and supported by, for example, four legs (not shown).

The center base body 17 has a substantially inverted truncated pyramid shape having a polygonal side (e.g., inverted truncated pyramid shape having square sides corresponding to the number of weighing hoppers 14, etc.) and is formed by a lower wall 17A, an upper wall 17B, and a side wall 17C.

As shown in FIG. 1, the combination weigher 100 includes actuator units 19 which open and close the hopper gates 13A of the feeding hoppers 13 and the hopper gates 14A of the weighing hoppers 14. As shown in FIG. 1, the actuator units 19 are mounted to the side wall 17C of the center base body 17.

Figure 2:
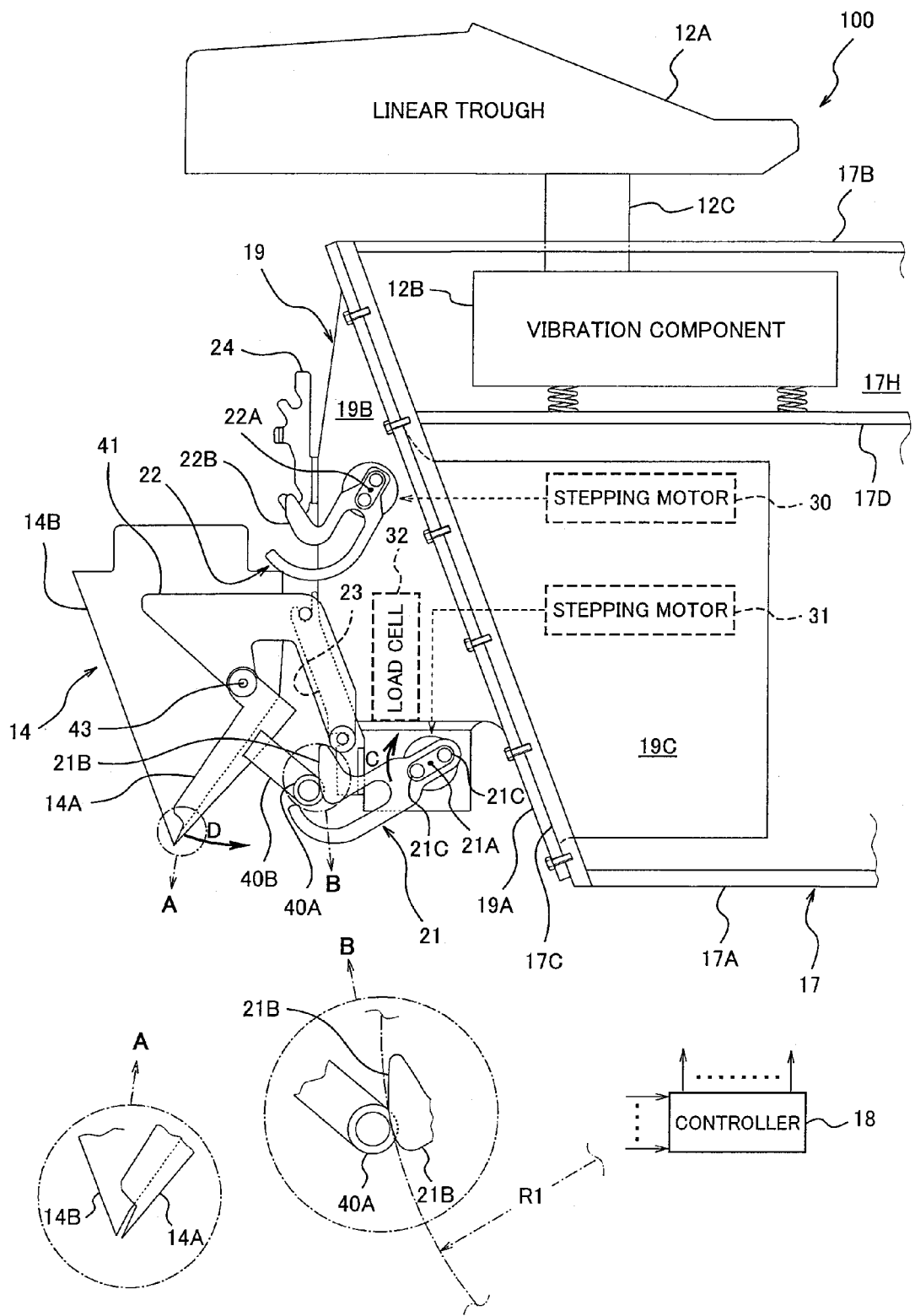
FIG. 2 is a view showing a region surrounding the mechanism for opening and closing the hopper gate according to the embodiment of the present invention.

As shown in FIGS. 1 and 2, a separating board 17D extending in a horizontal direction to separate an interior of the center base body 17 is disposed inside of the center base body 17.

Thus, the center base body 17 includes a unit accommodating room 17L located at a lower side to accommodate the actuator units 19, and a feeder accommodating room 17H located at an upper side to accommodate the vibration components 12B of the linear feeders 12.

In the present embodiment, the actuator unit 19 (especially, hopper gate opening/closing mechanism as will be described later) has features in its configuration.

Therefore, the features of the configuration of the present embodiment will be described in detail with reference to FIG. 2.

FIG. 2 is a view showing a region surrounding the hopper gate opening/closing mechanism according to the embodiment of the present invention.

In FIG. 2, only the weighing hopper 14 is shown, and the feeding hopper 13 is not shown. Although members such as a cam follower 40A, a cam holder 21, an actuation plate 40B, a hanger 23, and a bracket 41, which will be described later, are provided at each of both sides of the weighing hopper 14 and form pairs, the members disposed at a far side in FIG. 2, of the members forming pairs, are not shown.

As shown in FIG. 2, each actuator unit 19 has a configuration in which a weighing/opening/closing unit section 19B provided outside of the center base body 17 and a driving unit section 19C provided inside of the unit accommodating room 17L are integrally constructed as modules.

In the driving unit section 19C, the stepping motor 31, the stepping motor 30, and link mechanisms (not shown) for transmitting driving forces of the motors 30 and 31 are provided.

As shown in FIG. 2, in the actuator unit 19, a mounting section 19A of the actuator unit 19 is provided to extend along the side wall 17C between the weighing/opening/closing unit section 19B and the driving unit section 19C. By providing a suitable fastening means (e.g., screw hole, etc.) on the mounting section 19A, the actuator unit 19 is fastened to the side wall 17C so that the driving unit section 19C can be accommodated in the unit accommodating room 17L.

In the weighing/opening/closing unit section 19B, a hopper gate opening/closing mechanism of the weighing hopper 14, a hopper body holding mechanism of the weighing hopper 14, a hopper gate opening/closing mechanism of the feeding hopper 13, a hopper body holding mechanism of the feeding hopper 13, and the load cell 32 coupled to the weighing hopper 14, are provided.

First of all, the hopper gate opening/closing mechanism and the hopper body holding mechanism of the weighing hopper 14 will be described.

As shown in FIG. 2, the weighing hopper 14 includes the hopper gate 14A supported such that the hopper gate 14A is rotatable around a pivot 43. The actuator plate 40B protrudes from an outer surface of the hopper gate 14A. The cam follower 40A is attached to a tip end portion of the actuation plate 40B.

Outside of the actuator unit 19, a base end portion of the cam holder 21 is coupled to a lower portion of the weighing/opening/closing unit section 19B of the actuator unit 19 by using a suitable fastening means (in the present embodiment, a pair of fastening bolts 21C). The cam follower 40A is in contact with a curved surface 21B of a front portion of the cam holder 21.

As shown in FIG. 2, in the hopper gate opening/closing mechanism of the present embodiment, the front end portion of the cam holder 21 has a structure in which two elongated portions of a fork-shaped member are curved upwardly. A surface of this curved portion which faces the cam follower 40A is the curved surface 21B.

In the hopper gate opening/closing mechanism of the weighing hopper 14 of the present embodiment configured as described above, when the cam holder 21 is rotated in a direction of an arrow C around a rotational shaft 21A by a driving force applied by the stepping motor 31, the cam follower 40A rolls on the curved surface 21B of the cam holder 21, thereby causing the hopper gate 14A to be pivoted in a direction of an arrow D around the pivot 43. As a result, the hopper gate 14A is opened (this will be described in detail with reference to FIG. 3).

The hopper gate opening/closing mechanism is configured in such a manner that the cam follower 40A does not roll on the curved surface 21B of the cam holder 21 in the position (position shown in FIG. 2) at which the hopper gate 14A is closed.

As indicated by an enlarged portion B of FIG. 2, a curvature radius R1 of the curved surface 21B of the cam holder 21 is set so that a displacement of the cam follower 40A is restricted by the curved surface 21B of the cam holder 21. In this case, the curved surface 21B of the cam holder 21 serves as a stopper section of the hopper gate 14A.

In this way, in the hopper gate opening/closing mechanism, the cam follower 40A and the cam holder 21 constitute a cam mechanism serving as the stopper section of the hopper gate 14A. The cam follower 40A corresponds to a driven section of the cam mechanism, while the cam holder 21 corresponds to a driving section of the cam mechanism.

In the above described configuration, the hopper gate opening/closing mechanism has various advantages as described below.

Firstly, the cam mechanism enables the hopper gate 14A to be opened and closed by the driving force applied by the stepping motor 31. In addition, the cam mechanism (curved surface 21B of the cam holder 21) is able to inhibit the hopper gate 14A from being opened in the position at which the hopper gate 14A is closed. In the hopper gate opening/closing mechanism, because of the cam mechanism as the stopper section of the hopper gate 14A, the special mechanism (e.g., conventional toggle link mechanism, etc.) for locking and unlocking in the conventional stopper section becomes unnecessary. Furthermore, it becomes possible to avoid an increase in motor torque of the stepping motor 31 which would otherwise be caused by the locking and unlocking in the conventional stopper section. Moreover, since the number of components of the stopper section of the hopper gate 14A can be reduced, the configuration of the stopper section can be simplified.

Secondarily, by disengaging the fastening bolts 21C, the cam holder 21 can be easily detached from the actuator unit 19. Therefore, in the hopper gate opening/closing mechanism, according to the configuration (e.g., single swing gate type or double swing gate type) of the weighing hopper 14, an internal volume of the weighing hopper 14, etc., the optimal cam holder 21 can be easily attached.

Thirdly, when the fastening bolts 21C are untightened (loosened), the cam holder 21 can be slightly displaced. Because of this, relative positions of the cam follower 40A and the cam holder 21 can be changed easily, and hence an opening degree θ (see FIG. 3) of the hopper gate 14A can be finely adjusted based on the change in a relative distance between the cam follower 40A and the cam holder 21. Therefore, in the hopper gate opening/closing mechanism, when the hopper gate 14A is closed, the hopper gate 14A can be opened a little with a gap between the hopper gate 14A and the hopper body 14B to an extent that the objects do not fall through the gap (see enlarged portion A in FIG. 2). This makes it possible to mitigate a noise which would otherwise be generated by contact between the hopper gate 14A and the hopper body 14B when the hopper gate 14A is opened and closed.

As shown in FIG. 2, the hopper body holding mechanism of the weighing hopper 14 includes the hanger 23 and the bracket 41. The bracket 41 is coupled at the pivot 43 to the hopper body 14B of the weighing hopper 14 and attached to the hanger 23. Thus, in a state in which the hopper body 14B of the weighing hopper 14 is supported, the hopper gate 14A of the weighing hopper 14 can be opened and closed.

Next, the hopper gate opening/closing mechanism and the hopper body holding mechanism of the feeding hopper 13 will be described. The detail of the hopper gate opening/closing mechanism of the feeding hopper 13 can be easily understood by considering the above description relating to the hopper gate opening/closing mechanism of the weighing hopper 14. Therefore, the hopper gate opening/closing mechanism will be briefly described herein.

The hopper gate opening/closing mechanism of the feeding hopper 13 includes a cam holder 22 which is rotatable around a rotational shaft 22A and a cam follower (not shown). The cam follower is coupled to the hopper gate 13A (see FIG. 1) of the feeding hopper 13 by using an actuation plate (not shown). The cam follower contacts a curved surface 22B of a front end portion (curved portion) of the cam holder 22.

In the hopper gate opening/closing mechanism of the feeding hopper 13, the cam follower (not shown) and the cam holder 22 constitute a cam mechanism. The cam follower corresponds to a driven section of the cam mechanism, while the cam holder 22 corresponds to a driving section of the cam mechanism.

In this configuration, the hopper gate 13A can be opened and closed by the driving force applied by the stepping motor 30. In addition, the hopper gate 13A is inhibited from being opened in the position at which the hopper gate 13A is closed.

The hopper body holding mechanism of the feeding hopper 13 includes the hanger 24 and a bracket (not shown). The bracket is coupled at a pivot (not shown) to the hopper body 13B (see FIG. 1) of the feeding hopper 13 and attached to the hanger 24. Thus, in a state in which the hopper body 13B of the feeding hopper 13 is supported, the hopper gate 13A of the feeding hopper 13 can be opened and closed.

Next, a hopper opening/closing operation which is performed by the hopper gate opening/closing mechanism of the weighing hopper 14 of the present embodiment will be described in detail with reference to the drawings. A hopper opening/closing operation which is performed by the hopper gate opening/closing mechanism of the feeding hopper 14 can be easily understood from description below and therefore will not be described herein.

FIG. 3 is a view showing the operation of the hopper gate opening/closing mechanism of FIG. 2.

Figure 3A:
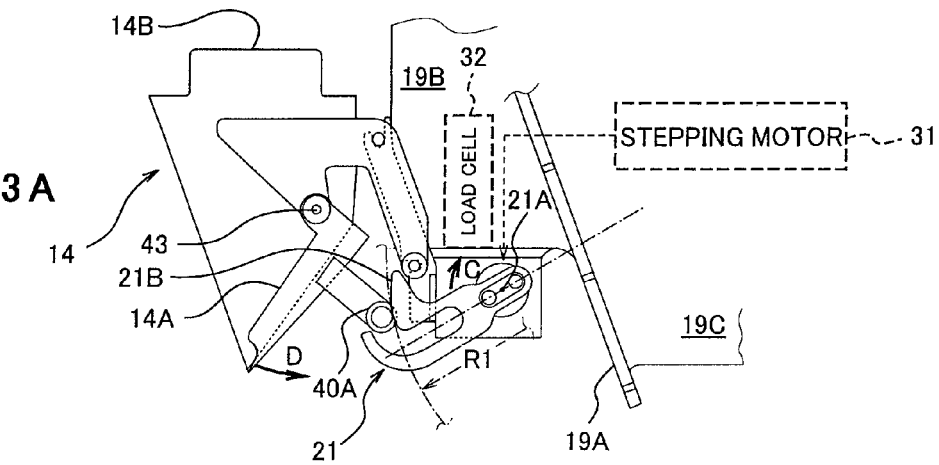
FIG. 3 is a view showing an operation of the mechanism for opening and closing the hopper gate of FIG. 2.

FIG. 3A shows a state in which the cam mechanism (curved surface 21B of cam holder 21) of the hopper gate opening/closing mechanism inhibits the hopper gate 14A from being opened in the position where the hopper gate 14A is closed as already described with reference to FIG. 2.

Figure 3B:
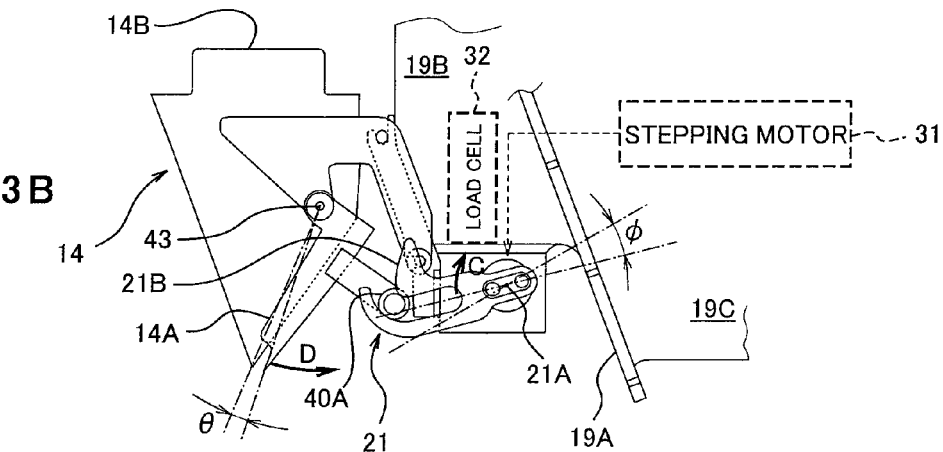
Figure 3C:
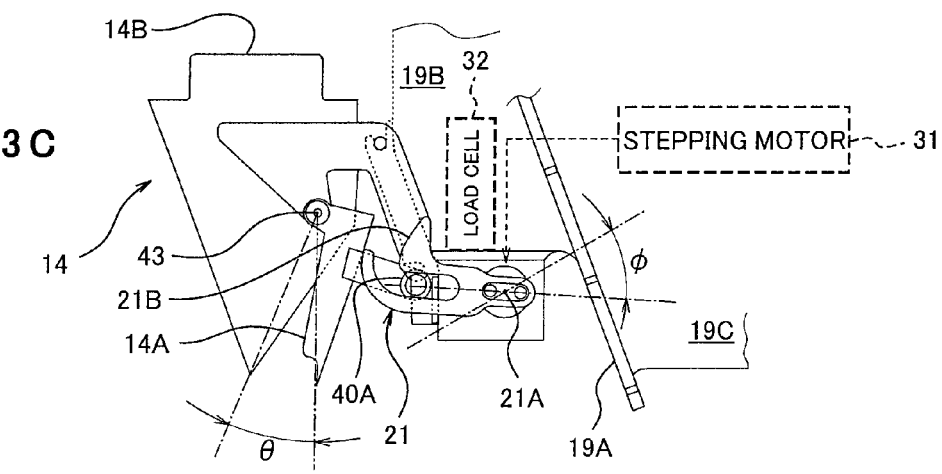

As shown in FIGS. 3B and 3C, when the cam holder 21 is rotated (e.g., rotated at a constant angular speed) in the direction of the arrow C around the rotational shaft 21A by the driving force applied by the stepping motor 31, under the state of FIG. 3A, the cam follower 40A rolls on the curved surface 21B (to be precise, surface of the curved portion of the cam holder 21 which the cam follower 40A contacts) of the cam holder 21, thereby causing the hopper gate 14A to be pivoted in a direction of the arrow D around the pivot 43. Thereby, the hopper gate 14A is opened.

At this time, the opening/closing operation of the hopper gate 14A can be controlled based on a shape of the curved surface 21B of the cam holder 21.

Although an opening/closing speed of the hopper gate 14A is described as an example of the opening/closing operation of the hopper gate 14A, a determination basis of the opening/closing operation of the hopper gate 14A is not limited to this. For example, a change rate "θ/φ" of the opening degree θ per unit rotational angle φ which is derived by dividing the opening degree v of the hopper gate 14A by the rotational angle φ of the cam folder 21 in a case where its angular speed is constant, is provided as the opening/closing speed of the hopper gate 14

Therefore, in the hopper gate opening/closing mechanism of the weighing hopper 14 of the present embodiment, according to the configuration (e.g., single swing gate type or double swing gate type) of the weighing hopper 14, an internal volume of the weighing hopper 14, etc., the shape of the curved surface 21B of the cam holder 21 can be changed (processed) mechanically. Therefore, it is possible to easily provide the cam holder 21 having an optimal shape (e.g., shape which can attain an optimal opening/closing speed of the hopper gate 14A).

By this advantage in addition to the above described advantage that the cam holder 21 can be detached by disengaging the fastening bolts 21C outside of the actuator 17, various electric changes of an output pattern (motor pattern) of the stepping motor 31 can be substantially implemented mechanically by using the cam holder 21.

Specifically, in the hopper gate opening/closing mechanism of the weighing hopper 14 of the present embodiment, the curvature radius of the curved surface 21B of the cam holder 21 is set to a suitable value so as to increase/decrease the opening/closing speed of the hopper gate 14A.

Specifically, a curvature radius R1 (see FIG. 3A) of the curved surface 21B of the cam holder 21 which the cam follower 40A contacts in the position where the hopper gate 14A is closed, is greater than a curvature radius of the curved surface 21B of the cam holder 21 which the cam follower 40A contacts in a position in the middle of opening/closing of the hopper gate 14A (e.g., position shown in FIG. 3B).

Thereby, the opening/closing speed of the hopper gate 14A can be decreased in a position (e.g., in the vicinity of the position shown in FIG. 3A) which is immediately before the hopper gate 14A is closed. Therefore, it becomes possible to mitigate a noise which would otherwise be generated by contact between the hopper gate 14A and the hopper body 14B when the hopper gate 14A is opened and closed.

With this advantage in addition to the above described advantage that the noise can be prevented by loosening the fastening bolts 21C to slightly displace the cam holder 21, a work environment of the combination weigher 100 can be improved significantly.

On the other hand, the opening/closing speed of the hopper gate 14A can be increased in the position in the middle of opening/closing of the hopper gate 14A (e.g., in the vicinity of position shown in FIG. 3B), the opening/closing operation of the hopper gate 14A can be performed efficiently.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Modified Example 1

Although in the hopper gate opening/closing mechanism of the weighing hopper 14 of the present embodiment, the front end portion of the cam holder 21 has a structure in which two elongated portions of a fork-shaped member are curved upwardly, the present invention is not limited to this.

For example, a disc-shaped member which is subjected to curved surface processing to have the same shape as that of the curved surface 21B of the cam holder 21 may be used as the cam holder.

However, in this case, the disc-shaped member is greater in weight than the cam holder 21 described in the present embodiment. This will cause an increase in the motor torque of the stepping motor 30 as compared to the hopper gate opening/closing mechanism of the present embodiment.

Modified Example 2

Although in the present embodiment, the hopper gate opening/closing mechanism of the feeding hopper 13 and the hopper gate opening/closing mechanism of the weighing hopper 14 are described exemplarily, the present invention is not limited to this.

For example, in a case where the combination weigher includes a memory hopper, the hopper gate opening/closing mechanism of the present embodiment may be used to open and close a hopper gate of the memory hopper.

INDUSTRIAL APPLICABILITY

The present invention can provide a hopper gate opening/closing mechanism which can simplify a configuration of a stopper section of a hopper gate of a combination weigher. Therefore, the present invention can be used in hopper gate opening/closing mechanisms of various combination weighers used to weigh objects.

REFERENCE SINGS LISTS

11 dispersion feeder
12 linear feeder
12A linear trough
12B vibration component
12C support member
13 feeding hopper
13A hopper gate of feeding hopper
13B hopper body of feeding hopper
14 weighing hopper
14A hopper gate of weighing hopper
14B hopper body of weighing hopper
16 collecting chute
16A discharge outlet
17 center base body (body)
17A lower wall
17B upper wall
17C side wall
17D separating board
17H feeder accommodating room
17D unit accommodating room
18 controller
19 actuator unit
19A mounting section
19B weighing/opening/closing unit section
19C driving unit section
21 cam holder for weighing hopper
21A rotational shaft of cam holder for weighing hopper
21B curved surface of cam holder for weighing hopper
21C fastening bolt of cam holder for weighing hopper
22 cam holder for feeding hopper
22A rotational shaft of cam holder for feeding hopper
22B curved surface of cam holder for feeding hopper
23 hanger for weighing hopper
24 hanger for feeding hopper
30 stepping motor for feeding hopper
31 stepping motor for weighing hopper
32 load cell
40A cam follower for weighing hopper
40B actuation plate of weighing hopper
41 bracket for weighing hopper
43 pivot
100 combination weigher

The invention claimed is:

1. A mechanism for opening and closing a hopper gate which is used in a combination weigher which performs combination calculation based on weights of objects, to find a combination in which a total of the weights of the objects falls within an allowable range with respect to a target weight, the mechanism for opening and closing the hopper gate comprising:
   an actuator for generating a driving force for opening and closing the hopper gate; and
   a cam mechanism for opening and closing the hopper gate based on the driving force applied by the actuator;
   wherein the cam mechanism inhibits the hopper gate from being opened in a position at which the hopper gate is closed;
   wherein the cam mechanism includes a driven section and a driving section, and wherein the driven section of the cam mechanism is a cam follower and the driving section of the cam mechanism is a cam holder; and
   wherein the cam follower is configured to contact a curved surface of the cam holder, and the cam follower and the curved surface of the cam holder are configured to inhibit the hopper gate from being opened when the cam follower contacts the curved surface of the cam holder.

2. The mechanism for opening and closing the hopper gate according to claim 1, further comprising:
   an actuator unit provided with the actuator;
   wherein the cam mechanism is disposed outside of the actuator unit.

3. The mechanism for opening and closing the hopper gate according to claim 2,
   wherein an operation for opening and closing the hopper gate is controlled based on a shape of a driving section of the cam mechanism which a driven section of the cam mechanism is configured to contact.

4. The mechanism for opening and closing the hopper gate according to claim 2,
   wherein the cam follower is configured to roll on the curved surface of the cam holder to cause the hopper gate to be opened and closed.

5. The mechanism for opening and closing the hopper gate according to claim 4,
   wherein a curvature radius of the curved surface of the cam holder is set so as to increase or decrease an opening/closing speed of the hopper gate.

6. The mechanism for opening and closing the hopper gate according to claim 5,
   wherein a curvature radius of the curved surface of the cam holder which the cam follower contacts in a position where the hopper gate is closed is greater than a curvature radius of the curved surface of the cam holder which the cam follower contacts in a position in the middle of opening or closing of the hopper gate.

7. The mechanism for opening and closing the hopper gate according to claim 2,
wherein an opening degree of the hopper gate is adjustable based on relative positions of the driven section of the cam mechanism and the driving section of the cam mechanism.

8. The mechanism for opening and closing the hopper gate according to claim 2,
wherein the cam holder is a fork-shaped member having two upwardly curved elongated portions, and the curved surface of the cam holder is configured to maintain contact with the cam follower when the hopper gate is closed.

9. The mechanism for opening and closing the hopper gate according to claim 1,
wherein the cam holder is a fork-shaped member having two upwardly curved elongated portions, an upper one of the two upwardly curved elongated portions forming the curved surface of the cam holder and configured to maintain contact with the cam follower when the hopper gate is closed.

10. The mechanism for opening and closing the hopper gate according to claim 1, further comprising:
a hopper body provided with the hopper gate;
wherein a clearance gap is formed between the hopper gate and the hopper body such that the objects do not fall through the clearance gap when hopper gate is closed.

11. A mechanism for opening and closing a hopper gate which is used in a combination weigher which performs combination calculation based on weights of objects, to find a combination in which a total of the weights of the objects falls within an allowable range with respect to a target weight, the mechanism for opening and closing the hopper gate comprising:
an actuator for generating a driving force for opening and closing the hopper gate; and
a cam mechanism for opening and closing the hopper gate based on the driving force applied by the actuator;
wherein the cam mechanism includes a cam follower and a cam holder, the cam holder being fork-shaped and including an upper upwardly curved elongated portion and a lower upwardly curved elongated portion, the upper upwardly curved elongated portion forming a curved surface, the curved surface arranged to inhibit the hopper gate from being opened from a closed position by contact with the cam follower; and
wherein the upper and lower elongated portions are arranged to decrease a first opening or closing speed of the hopper gate when the hopper gate is adjacent a closed position relative to a second opening or closing speed of the hopper gate when the hopper gate is adjacent a middle position.

12. The mechanism for opening and closing the hopper gate according to claim 11, wherein the curved surface has a first curvature radius and a second curvature radius less than the first curvature radius, the first curvature radius in contact with the cam follower when the hopper gate is adjacent the closed position and the second curvature radius in contact with the cam follower when the hopper gate is adjacent the middle position.

* * * * *